July 28, 1931.    L. C. HUCK    1,816,256
BRAKE
Filed Feb. 20, 1928    3 Sheets-Sheet 1
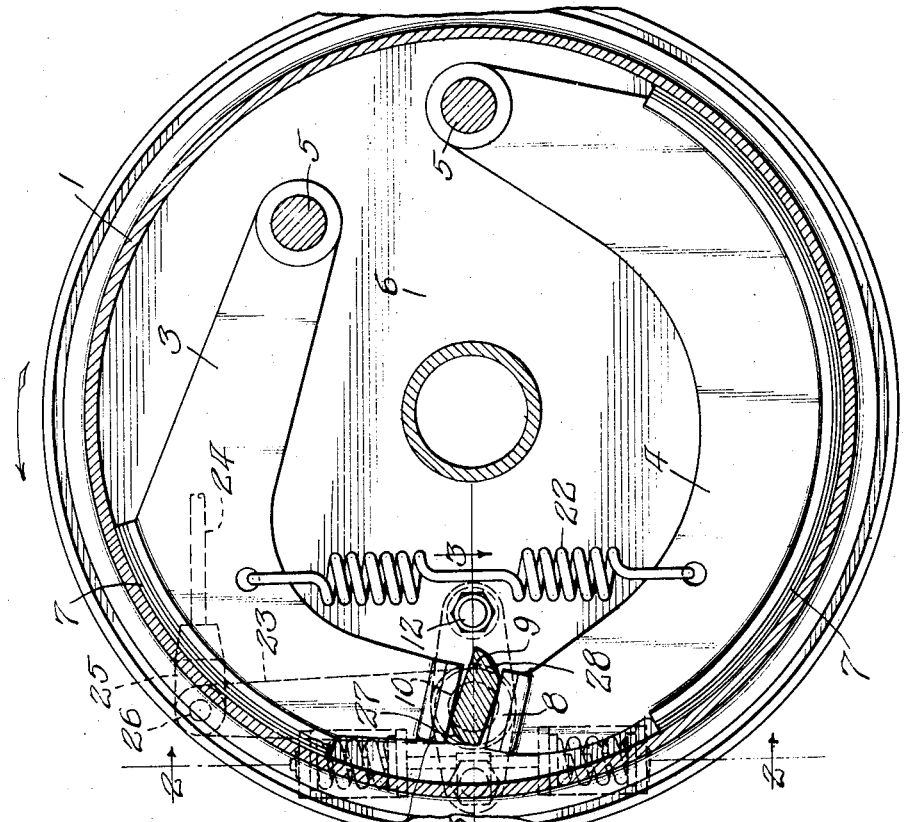
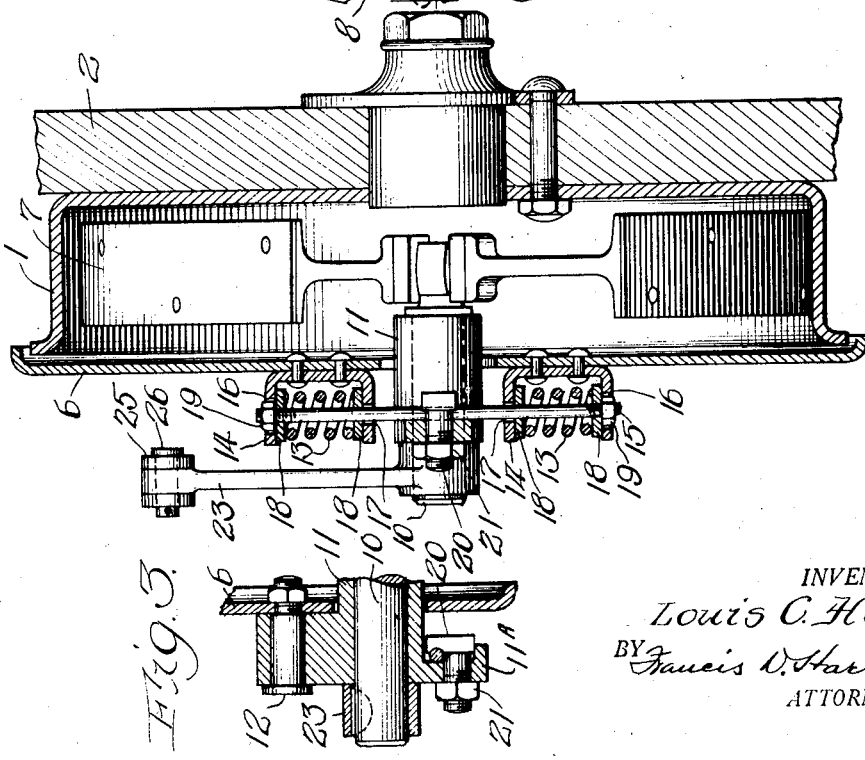
INVENTOR.
Louis C. Huck,
BY Francis D. Hardesty
ATTORNEY.

July 28, 1931. L. C. HUCK 1,816,256
BRAKE
Filed Feb. 20, 1928 3 Sheets-Sheet 2
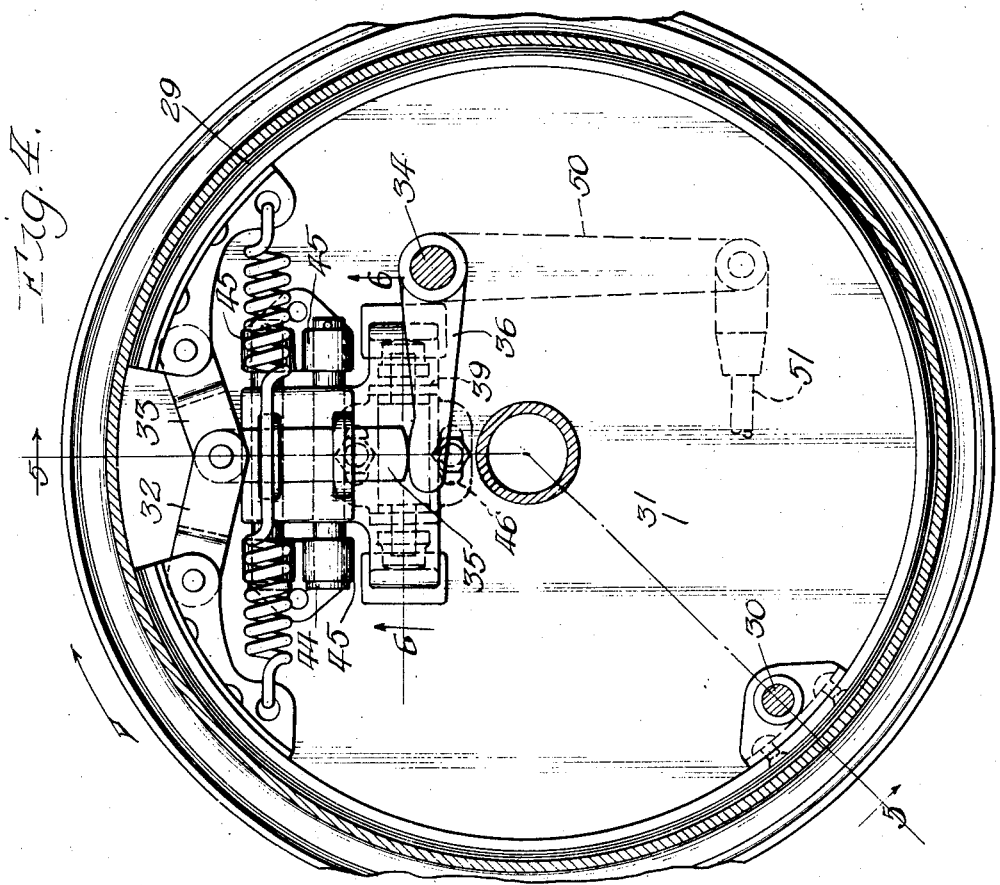
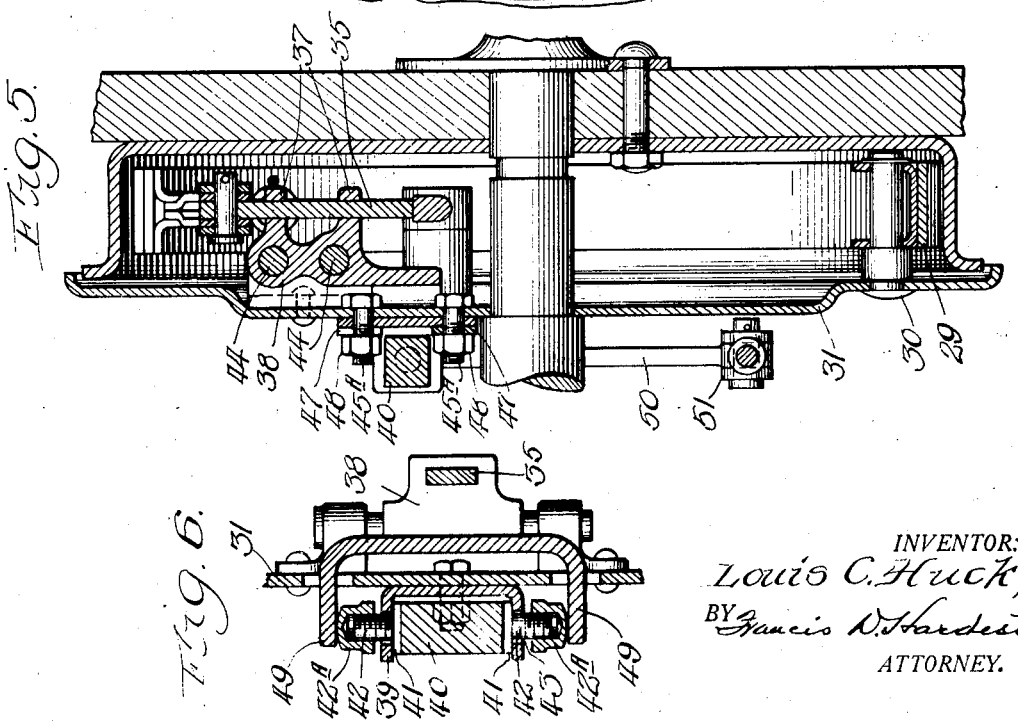
INVENTOR:
Louis C. Huck,
BY Francis D. Hardesty
ATTORNEY.

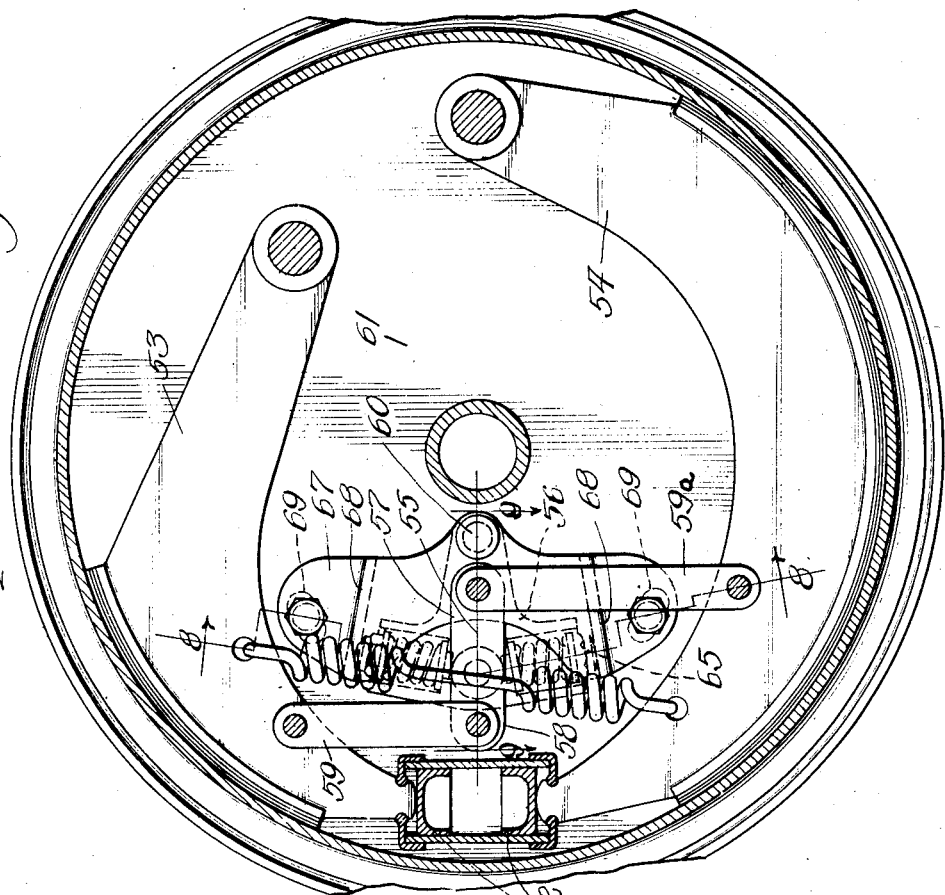
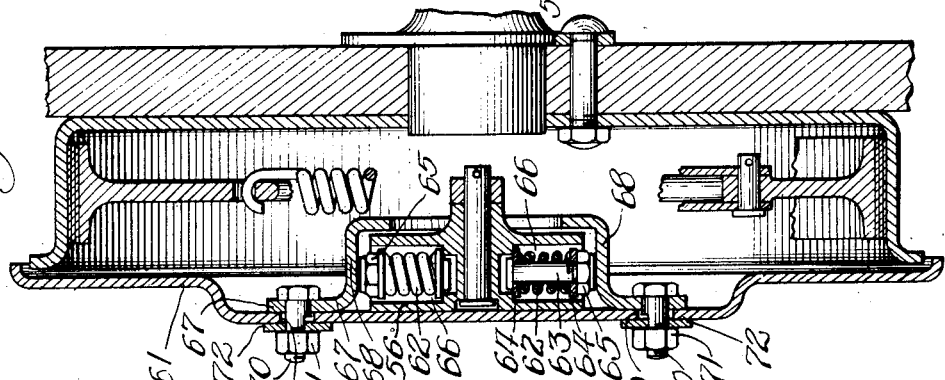
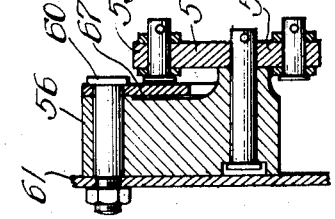

Patented July 28, 1931

1,816,256

UNITED STATES PATENT OFFICE

LOUIS C. HUCK, OF PLEASANT RIDGE, MICHIGAN

BRAKE

Application filed February 20, 1928. Serial No. 255,607.

My invention relates to a friction brake mechanism which is particularly adapted for use in connection with the wheels of motor vehicles, but which is capable of use in any other connection where a brake is required for the absorption of energy, and relates more particularly to the means for positioning the stationary elements with respect to the rotating element.

One of the objects of my invention is to provide a means for allowing the shoes and shoe actuating mechanism to position themselves within the brake drum in such a way that on release of the brake the necessary clearance at the point of minimum clearance will be accomplished with a minimum movement of the brake actuating means.

Another object of my invention is to provide a mechanism for positioning the shoes and actuating means within the brake drum so as to allow the actuating means to have substantially a differential, compensating, or floating action during the application of the brakes, and yet position these parts so as to avoid any displacement due to their weight or due to a failure to return to normal released position because of friction between parts, and so as to avoid any motion of these parts relative to the drum due to road shocks.

Another object of my invention is to provide a means for allowing the shoes and actuating means to position themselves when the brake is applied so that both shoes, or both sides of a band shoe, will simultaneously move away from the drum on release movement of the actuating means.

Further objects of my invention and advantages resulting from its use will more fully appear hereinafter.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:—

Figure 1 is a partially fragmentary vertical section of a cam operated shoe brake mechanism embodying my invention, and showing the internal parts;

Figure 2 is a sectional view taken along line 2—2 of Figure 1, but showing the remainder of the drum in central vertical transverse section;

Figure 3 is a fragmentary section taken along line 3—3 of Figure 1;

Figure 4 shows a partially fragmentary side view of a toggle operated band brake embodying my invention;

Figure 5 illustrates a section taken along line 5—5 of Figure 4;

Figure 6 is a sectional view taken along line 6—6 of Figure 4;

Figure 7 is a partially fragmentary side view of a hydraulically operated shoe brake embodying my invention;

Figure 8 is a section taken along line 8—8 of Figure 7;

Figure 9 is a section taken along line 9—9 of Figure 7.

Referring now to Figures 1, 2 and 3, the brake drum 1 is attached by suitable means to the rotating element which, in the drawings, has been shown as an automobile wheel 2. Brake shoes 3 and 4 are pivoted on anchor pins 5, which in turn are secured by suitable means to brake anchor 6. The shoes are each provided with a suitable lining material 7. Cam bearing plates 8 are fastened to the shoes, against which bearing plates cam 9 bears. Rotation of the actuating shaft 10 causes the cam 9 to bring the shoes 3 and 4 into frictional engagement with the drum 1. Actuating shaft 10 is journaled in actuating shaft carrier 11. Pin 12 is attached to brake anchor 6 and serves as a pivot for actuating shaft carrier 11, constraining the motion thereof and allowing only rotation thereof around center line of pin 12 which rotation allows the cam 9 to float with the shoes 3 and 4. Resilient members shown as steel springs 13 are held in initial distortion by brackets 14, which are attached to the brake anchor 6. Bolt 15 passes through holes 16 and 17 in brackets 14, and also through holes in washers 18 positioned between springs 13 and walls of brackets 14. Bolt 15 is provided with a nut 19 arranged to take up the slack in bolt 15. The head of bolt 15 and also the nut 19 engage washers 18. Clamp bolt 20 is provided with nut 21, whereby bolt 15 may be securely clamped to actuating shaft carrier 11, which is provided with a shoulder 11A to prevent rotation of clamp bolt 20. Release spring 22 is provided to normally hold the brake shoes 3 and 4 out of engagement with the drum 1. Lever 23 is keyed to actuating shaft 10 and adapted to rotate actuating shaft 10 by a pull applied to rod or cable 24 fitted to lever 23 by means of clevis 25 and clevis pin 26. The contours 27 and 28 of cam 9 engaging shoes 3 and 4, respectively, are proportioned so as to give substantially equal radial movement to linings 7 on shoes 3 and 4 at their respective points of minimum radial movement for a given increment of rotation of the cam, which is the normal motion of the actuating means for moving the shoes into contact with the drum.

In assembling the parts, nut 19 preferably is tightened only sufficiently to take out all slack in bolt 15 without carrying an appreciable part of the reaction of springs 13 due to their initial distortion. However, nuts 19 or the corresponding parts in the other forms shown may be used as means for manually adjusting the position of the actuating mechanism if desired.

In the operation of the device, both shoes are first brought into contact with the drum by the normal rotation of the actuating shaft 10. If, due to unequal wear in service or due to manufacturing tolerances, one shoe should engage the drum while there is still clearance between the other shoe and the drum, the actuating shaft carrier will have a differential action, that is to say, will have a motion supplemental to its normal motion to compensate when sufficient pressure is applied to the actuating shaft lever to overcome the resistance of one of the springs 13, due to its initial compression. Bolt 15 will then project out of the other bracket, its head or nut, as the case may be, disengaging the washer. One of the springs 13 will then be distorted more than its initial distortion and the reaction to this entire distortion will be carried by bolt 15. The mechanism positioning the actuating shaft carrier is now out of equilibrium, and on release of clamp bolt 20, bolt 15 will shift relative to actuating shaft carrier 11, allowing springs 13 and associated parts to regain a position of equilibrium and with only their initial distortion. Clamp bolt 20 is then again tightened to clamp the bolt 15 securely to actuating shaft carrier 11. When now the brakes are released the clearance between linings 7 on shoes 3 and 4, respectively, at their respective points of minimum clearance will be substantially the same due to the unsymmetry of cam surfaces 27 and 28 previously described. With brakes applied and counter-clockwise rotation of the brake drum, as indicated by arrow in Figure 1, the frictional action tends to cause shoe 4 to engage more firmly with the drum, while it tends to disengage shoe 3. As a result, were the actuating shaft 10 rigidly journaled, and so positioned as to cause the cam to press against the cam plates 8 of shoes 3 and 4, with the same pressure for a given torque on the cam shaft 10 when brake drum 1 is stationary, then, with drum 1 rotating counterclockwise, shoe 4 would compress its lining and bulge the brake drum the same amount as it did with drum 1 stationary with less pressure on its cam plate.

As a result shoe 3, on which the frictional forces act to rotate the shoe in an opposite direction about its anchor pin than does the cam force, and is, therefore, less efficient, would receive a larger part of the applied effort through the cam. However, with the use of my invention this is not possible as shoe 3 could only receive as much more pressure than shoe 4 as is required to overcome the initial compression of one of the centralizer springs 13, plus a slight build up in pressure due to actual motion incident to the differential, compensating or floating action of the actuating shaft carrier.

It will thus be seen that with the use of my invention the actuating means is a substantially differentially acting, floating or compensating actuating means, in that it tends to maintain a definite division of the pressure exerted on the shoes by the actuating means, regardless of unequal resistance to movement of or unequal clearance between the two brake elements or shoes and the brake drum. The term "substantially" is added to modify "differentially acting actuating means" to signify that the action is only completely of a differential or compensating nature after the initial distortion of the resilient members, the friction of the mechanism and the resilient resistance to further distortion of the resilient member has been overcome. However, the force necessary to overcome these resistances is relatively so small when compared to the total forces available to cause differential action under usual and normal operation of the brakes that it is practically negligible.

It will be noted that with the direction of rotation of the brake drum indicated by the arrow, which is the most frequent or usual direction of rotation against which braking is done, such as, for instance, when decelerating the forward motion of an automobile, shoe 4 will do more braking than shoe 3, because neglecting the initial support due to the initial distortion of springs 13, and also neglecting friction, the torque on shoe 4 tending to swing it into the drum will be the torque due to the cam pressure plus the torque of the frictional forces, whereas the torque tending to swing the shoe 3 into the drum will be the torque of the same cam force minus the torque of the frictional forces. It is for this reason that shoe 4 is made longer and consequently carries more lining than does shoe 3.

Figures 4, 5 and 6 show another form of mechanism embodying my invention and applied to a band type of brake, wherein 29 is a band type of brake shoe having ends spaced apart. Anchor stud 30 is rigidly attached to brake anchor plate 31, and is positioned to allow a greater arc of shoe on one side than on the other, so that the self-actuation or wrapping is greater with the brake drum rotating in clockwise direction, as shown by the arrow, Figure 4, than when rotating in the opposite or counter-clockwise direction of rotation. Links 32 and 33 function as a toggle to bring the shoes into frictional engagement with the drum on rotation of actuating shaft 34. Link 35 connects the toggle formed by links 32 and 33 with lever 36 mounted on shaft 34, and passes through support brackets 37 which are formed integrally with actuating mechanism carrier 38. Bracket 39 holds a resilient member shown as a rubber block 40 in initial compression. Washers 41 are interposed between the walls of bracket 39 and rubber block 40, and are fitted with studs 42 projecting through holes 43 in walls of bracket 39. Cap nuts 42A act as an adjustment for the effective length of studs 42. The motion of the actuating mechanism carrier 38 is constrained by rods 44, which engage guides 45, which are in turn rigidly fastened to anchor plate 31 which constrained motion is, in the present mechanism, a floating, compensating, or differential action. Studs 45A are attached to anchor plate 31, in any suitable manner, as by welding, and pass through elongated holes 46 in base of bracket 39. These studs 45A are preferably provided with means to prevent rotation of washers 47 when the nuts 48 are tightened. Projections 49 form a fork integral with actuating mechanism carrier 38, and are arranged to engage cap nuts 42A. Toggle links 32 and 33 are positioned at different angles to link 35, for the same purpose as given above for the unsymmetry of cam 9, that is, so that motion of link 35 through support brackets 37 of actuating mechanism carrier 38 will impart the correct ratio of motion to the long and short end of the band, so as to move them both into full contact with the drum substantially simultaneously, if the same amount of clearance existed between the drum and all points on band 29. Lever 50 is adapted to rotate actuating shaft 34 on movement of rod or cable 51. In the operation of this device the cap nuts 42A are adjusted to take up any lost motion of actuating mechanism carrier 38. If now the brakes are applied firmly the entire band will contact with the brake drum as the actuating mechanism carrier 38 will move to compensate, should there still be clearance on one side of the band when the other side is in full contact with the brake drum. Such motion of the carrier 38 will overcome the resistance of the resilient member 40 due to its initial compression, and will compress it further throwing the mechanism out of equilibrium. If with the brake in full engaged position nuts 48 are loosened, the bracket 39 will reposition itself to allow the bracket to take all the forces due to the initial compression of block 40 and the latter will return to its original initially distorted condition. Due to the fact that washers 47 engage flats on the studs 45A, the rotation of nuts 48 will not tend to disturb the position assumed by bracket 39, when nuts 48 are tightened to lock bracket 39 in the position assumed.

It is now obvious that the actuating mechanism will have a substantially differential or compensating action in that the difference in the vertical components of the forces tending to spread the two ends of the shoe apart and into contact with the drum can not exceed the resistance due to the initial compression and to the build up in compression of the resilient member 40, neglecting, of course, frictional resistances to motion of these parts.

Figures 7, 8 and 9 illustrate another form of my invention applied to hydraulically operated brakes. Pistons 52 are arranged to spread shoes 53 and 54 into contact with the brake drum. Lever 55 is pivotally mounted on carrier 56, and forms arms 57 and 58 of unequal length. Links 59 and 59ª connect the ends of lever 55 with shoes 53 and 54, suitable clevis pins being provided at all points of articulation. The arms 57 and 58 of lever 55 are made unequal in length to accomplish the same purpose as the unsymmetry of cam 9 and are proportioned to give the linings of shoes 53 and 54 substantially equal radial motion at their respective points of minimum radial motion without any movement of carrier 56. The motion of carrier 56 is constrained by pivot 60, which is rigidly attached to the anchor plate 61. Springs 62 are held in initial compression by means of bolts 63, washers 64, and cap nuts 65. These assemblies of springs and washers fit into recesses 66 of carried 56. Stop plate 67 is also pivoted about pivot 60 and is formed in a box section having the sides 68 engaging the cap nuts 65. Anchor plate 61 is provided with elongated holes 69, through which pass the studs 70, which are attached to stop plate 67 in any suitable manner, as by welding, allowing a limited amount of rotation of stop plate 67 around pivot 60 when nuts 71, which are provided to lock the stop plate in any position, are loosened. Studs 70 are flatted and washers 72 having a corresponding flat are placed between the anchor plate 61 and the nuts 71, so as to prevent any tendency to move the stop plate when the nuts 71 are tightened. In the operation of the device the cap nuts 65 on bolts 63 are adjusted to take up all slack, i. e. so that the carrier 56 can not rotate about pivot 60 without further compressing one of the springs 62, and yet allowing the initial compression of springs 62 to be carried by bolts 63, less, of course, in the case of one or the other of the springs, the weight of carrier 56 and the parts supported thereby. It is obvious that if one shoe should contact with the drum while there is yet clearance between the other shoe and the drum the latter shoe will be able to contact the drum by rotating the carrier 56 about pivot 60, and overcoming the initial compression of one of the springs 62, and further compressing this spring. If now while both shoes are in contact with the brake drum, nuts 71 are loosened the stop plate 67 will rotate about pivot 60 and assume a position to allow the shoe and actuating means positioning mechanism to again come into equilibrium, i. e. allowing bolts 63 to carry the load due to the initial compression of the springs.

Having now described my invention, I claim:

1. In brake mechanism, a rotating member, a fixed anchor, an element mounted for movement into and out of frictional contact with said rotating member, floating means to move said element into frictional contact with said rotating member, a support adapted to adjustably position said element and said means with respect to said rotating member, said support including a resilient element, said holding means to hold said resilient element in initial distortion in such manner as to exert its influence on said first mentioned means in all positions away from its initially adjusted position.

2. In brake mechanism, a rotating member, a fixed anchor, an element mounted for movement into and out of frictional contact with said rotating member, floating means to move said element into frictional contact with said rotating member, a support adapted to adjustably position said element and said means with respect to said rotating member, said support including a resilient element, and holding means to hold said resilient element in initial distortion in such manner as to exert its influence on said first mentioned means in all positions away from its initially adjusted position, said holding means being adjustable to vary the initial distortion as desired.

3. In brake mechanism, a rotating member, a fixed anchor, an element mounted for movement into and out of frictional contact with said rotating member, floating means to move said element into frictional contact with said rotating member, a support adapted to position said element and said means with respect to said rotating member, said support including a resilient element, and holding means to hold said resilient element in initial distortion in such manner as to exert its influence on said first mentioned means in all positions away from normal, and releasable means to allow an automatic repositioning of the support upon release of said releasable means, while the frictional surfaces are in contact.

4. In brake mechanism, a rotating member, a fixed anchor, an element mounted for movement into and out of frictional contact with said rotating member, floating means to move said element into frictional contact with said rotating member, a support adapted to position said element and said means with respect to said rotating member, said support including a resilient element, and holding means to hold said resilient element in initial distortion in such manner as to exert its influence on said first mentioned means in all positions away from normal, and releasable means to allow repositioning of the support upon release of said releasable means.

5. In brake mechanism, a rotating drum, a fixed anchor, a brake shoe movable into and out of contact with said drum, floating actuating means to move said shoe into frictional contact with said drum, supporting means to adjustably position said shoe and said actuating means with respect to said drum, said supporting means including resilient means, and holding means to hold said resilient means in initial distortion, said resilient means exerting its influence on said actuating means in all positions away from its initially adjusted position.

6. In brake mechanism, a rotating drum, a fixed anchor, a brake element movable into and out of contact with said drum, floating actuating means to move said element into frictional contact with said drum, supporting means to position said element and said actuating means with respect to said drum, said supporting means including resilient means, and holding means to hold said resilient means in initial distortion, said resilient means exerting its influence on said actuating means in all positions away from its initially adjusted position, said supporting means being adjustable to vary the clearance at different parts of the element and the drum as desired.

7. In brake mechanism, a rotating drum, a fixed anchor, a pair of brake shoes movable into and out of contact with said drum, floating actuating means to move said shoes into frictional contact with said drum, supporting means to position said shoes and said actuating means with respect to said drum, said supporting means including resilient means, and holding means to hold said resilient means in initial distortion, said resilient means exerting its influence on said actuating means in all positions away from its initially adjusted position, said supporting means being adjustable to divide the clearance between the shoes and the drum as desired.

8. In brake mechanism, a rotating drum, a fixed anchor, a pair of oppositely movable brake shoe elements having spaced apart ends, actuating means mounted to extend between said spaced apart ends to move said shoe elements into frictional contact with said drum, supporting means to floatingly support said actuating means, said supporting means including initially distorted resilient means adjustable to yieldingly hold said actuating means in different positions relative to the drum when the shoes are out of contact with the drum.

9. In brake mechanism, a drum, an anchor member, brake shoe elements having spaced apart ends, actuating means for moving said shoe elements into contact with said drum, supporting means to floatingly support said actuating means, said supporting means including initially distorted resilient means constructed and arranged to permit repositioning of the actuating means.

10. In brake mechanism, a brake drum, a brake anchor, brake shoe elements movable into and out of contact with said drum, means for moving said brake shoe elements into contact with the drum, and including an actuating member, means to adjust the position of said actuating member with respect to the brake anchor including a resilient member, holding means to hold said resilient member in a distorted position, and restraining means to restrain by further deformation of said resilient member any motion of said actuating member relative to the brake anchor, other than its normal motion to bring said shoe elements into contact with said drum.

11. In brake mechanism, a brake drum, a brake anchor, brake shoe elements movable into and out of contact with said drum, means for moving said brake shoe elements into contact with the drum, including an actuating member, means to position said actuating member with respect to the brake anchor, said latter means including a resilient member, holding means to hold said resilent member in a distorted position, and restraining means to restrain by further deformation of said resilient member any motion of said actuating member relative to the brake anchor, other than its normal motion to bring said shoe elements into contact with said drum, and means to relieve such further deformation when the brake shoe elements are in full contact with the brake drum.

12. In brake mechanism, a brake drum, a braking element adapted to be brought into frictional contact with said drum, means to move said braking element into contact with said drum, a resilient member associated with said means, said resilient member being held under initial deformation, said means having a substantially differential action by reason of the further deformation of the resilient member, and releasable means releasable when the braking element is in contact with the drum to allow said resilient member to return to the initial deformation carried by said holding means.

13. In brake mechanism, a brake drum, a brake anchor, brake shoe elements, actuating means to move said shoe elements into contact with said drum and arranged to have a substantially differential action, resilient means to oppose said action, said resilient means being held under initial deformation by separate holding means adjustable to initially position said actuating means.

14. In brake mechanism a brake drum, an anchor member, brake shoe elements, actuating means to move said shoe elements into frictional contact with said drum, resilient means held under initial distortion and arranged to position said shoe elements relative to said drum, but capable of further distortion when one of said shoe elements contacts with the drum before the other in applying the brakes, and releasable means to permit said resilient means to automatically return to said initial distortion while said brakes are held in applied position.

15. In brake mechanism a brake drum, an anchor member, brake shoe elements, actuating means to move said shoe elements into contact with said drum, resilient means arranged to position said actuating means, separate means to hold said resilient means in initial distortion, means to allow said actuating means to have a substantially differential action by further distortion of said resilient means, and releasable means to allow said shoe elements and actuating means to be positioned by the resistance to further distortion of said resilient means.

16. In brake mechanism a brake drum, an anchor member, brake shoe elements, actuating means to move said shoe elements into contact with said drum, resilient means acting upon said actuating means, separate means to hold said resilient means in initial distortion, means to allow said actuating means to have a substantially differential action by further distortion of said resilient means, and means to position said shoe elements and actuating means by the resistance to further distortion of said resilient means, and releasable means for re-establishing the initial distortion of said resilient means with the shoe elements in engagement with said drum.

17. In brake mechanism a brake drum, an anchor member, a pair of brake shoes, actuating means to move said shoes into braking contact with said drum, a pair of springs positioned one on each side of said actuating means, each of said springs being held under initial distortion, means connecting said springs to each other and to said actuating means, means causing further distortion of one of said springs in applying the brakes when one of the shoes engages the drum before the other, the connection between said springs and said actuating means being releasable to permit the spring having further distortion to return to its initial distortion with both shoes in contact with the drum whereby said shoes may be set to compensate for unequal wear.

18. In brake mechanism, a brake drum, an anchor member, a pair of brake shoes, actuating means to move said shoes into braking contact with said drum, a resilient member under initial distortion and arranged to normally position the actuating means relative to the drum in non-braking position, said resilient means being capable of further distortion in applying the brakes when one shoe contacts the drum before the other, supporting means normally holding said resilient member in initial distortion, locking means normally holding said supporting means fixed to said anchor member, said locking means being releasable to permit said resilient member when further distorted to return to its initial distortion with the brake shoes in contact with the drum.

19. In brake mechanism, a brake drum, an anchor member, a pair of brake shoe elements, actuating means for moving said shoe elements into frictional contact with the drum, a carrier pivotally mounted on said anchor member, a lever pivotally mounted on said carrier, links connecting the opposite ends of said lever with said shoe elements respectively, a spring on each side of said carrier, each of said springs being held under initial distortion, a stop plate associated with said carrier and releasably locked to said anchor member, whereby when one of the shoe elements contacts with the drum before the other, one of said springs will be further distorted and the means locking the stop plate to the anchor member may be released to cause said further distorted spring to return to its initial distortion.

20. In brake mechanism, a brake drum, an anchor member, a pair of spreading brake shoe elements, a carrier member movably mounted on said anchor member, actuating means carried by said carrier member, resilient means connected with said carrier member, said resilient means being under initial distortion, and releasable means which when released after said resilient means has been given further distortion will permit the resilient means to automatically return to its said initial distortion.

21. In brake mechanism, a brake drum, an anchor member, a pair of spreading brake shoe elements, actuating means to spread said brake shoe elements into frictional contact with said drum, resilient means under initial distortion adapted to normally position said actuating means, and releasable means to permit said resilient means after further distortion to automatically return to its said initial distortion.

22. In brake mechanism, a brake drum, a brake anchor, a brake shoe element arranged to be brought into frictional contact with said drum, actuating means disposed to move said shoe element into contact with said brake drum, said actuating means being supported by an arm pivotally mounted on said anchor, a resilient member, means to constrain said resilient member in a distorted position, and means to position said pivoted arm relative to said anchor by the resistance to further distortion of said resilient member and means to vary the so determined position of the pivoted arm relative to the anchor.

23. In brake mechanism, a brake drum, a brake anchor, a brake shoe element, actuating means to bring said shoe element into frictional contact with said drum, a resilient deformable element, separate means to hold said resilient deformable element in initial deformation, means to position said shoe element and actuating means relative to said brake drum by resistance to further resilient deformation of said deformable element, and means to vary the position of said shoe element and actuating means relative to said drum without causing further deformation of said resilient means.

24. In brake mechanism, a brake drum, a brake anchor, a brake shoe element, actuating means for the latter, a resilient element, means to hold said resilient element under initial distortion, said resilient element arranged to position the actuating means and shoe element relative to the drum, means to effect an adjustment whereby any motion of actuating means and shoe element relative to the drum will require further distortion of resilient element while allowing initial distortion of said resilient element while allowing initial distortion of said resilient element to be carried entrely by said separate means provided for that purpose.

25. In brake mechanism, a brake drum, a brake anchor, a pair of brake shoes adapted to pivot on said brake anchor, said shoes having arcs of contact of unequal length, said pivoting allowing arcuate surface of said brake shoes to frictionally engage said drum, actuating means to move said shoes about their pivots, said actuating means being arranged to give the necessary ratio of motion to each shoe respectively to cause the radial motion at the point on the arcuate surface of each shoe having the least radial motion, to be substantially the same for both shoes.

26. In brake mechanism, a brake drum, a brake anchor, a pair of brake shoes having an arcuate surface arranged to engage said drum, actuating means having a normal motion to move both shoes simultaneously toward said drum, said actuating means being arranged to give unequal motion to said shoes, but in the proportion necessary to cause substantially equal radial motion at the point on the arcuate surface of each shoe having the least radial motion.

27. In brake mechanism, a brake drum, a brake shoe element arranged to be brought into frictional contact with the drum having its ends spaced apart, anchor means disposed at a point other than the center of the arc subtended by said shoe element, actuating means adapted to simultaneously move the entire shoe element toward the brake drum by spreading said spaced apart ends and arranged to give unequal motion to said ends in the proportion necessary to bring the entire shoe element into contact, substantially simultaneously without a supplementary compensation motion of said actuating means.

28. In brake mechanism, a brake drum, an anchor, a pair of brake shoes having arcuate surfaces of unequal length and arranged to frictionally engage said drum, actuating means arranged to have both a normal motion, which moves both shoes toward said drum simultaneously, and a supplementary compensating motion which in itself moves one shoe toward the drum while the other shoe moves away from the drum, said actuating means being so arranged that its normal motion imparts the necessary ratio of motion to each shoe respectively so that the radial motion of the point on the arcuate surface of each shoe having the least radial motion is substantially the same.

29. In brake mechanism, a brake drum, an anchor, a pair of brake shoes having arcuate surfaces of unequal length and said arcuate surfaces arranged to engage said drum, actuating means arranged to move said shoes into contact with said drum in a manner such as to decrease the clearance at the point of minimum clearance of each shoe respectively at substantially the same rate.

30. In brake mechanism a brake drum, an anchor, a pair of shoes having arcuate surfaces adapted for frictionl engagement with said drum separate pivots for each shoe located at different distances from the axis of rotation of said drum, actuating means having a normal motion to decrease the clearance between each shoe and said drum simultaneously which normal motion moves each shoe at a rate necessary to give substantially equal radial motion at the point on the arcuate surface of each shoe having the least radial motion.

31. In brake mechanism, a brake drum, an anchor, a pair of brake shoes having different lengths of arcuate surfaces arranged for frictional engagement with said drum, actuating means to move said shoes into contact with said drum in a manner to effect substantially equal radial movement at the point of minimum radial movement of each shoe.

32. In brake mechanism a brake drum, an anchor, a pair of unlike brake shoes having arcuate surfaces and having ends spaced apart, a cam positioned between said spaced apart ends, said cam being unsymmetrical about its axis of rotation, said unsymmetry being such that the radial motion of the two shoes at their respective points of minimum radial motion on their arcuate surface is substantially the same.

33. In brake mechanism, a brake drum, an anchor, a pair of brake shoes having arcuate surfaces and having spaced apart ends, means adapted to spread apart said ends to cause contact between said arcuate surfaces and said drum, means for proportioning the movement of said ends so that the radial movement of the shoes at their respective points of minimum radial motion on their arcuate surfaces is substantially the same.

LOUIS C. HUCK.